(12) United States Patent
Li et al.

(10) Patent No.: US 8,899,471 B2
(45) Date of Patent: *Dec. 2, 2014

(54) METHOD FOR SEALING CURVED VACUUM GLASS AND CURVED VACUUM GLASS

(75) Inventors: Yanbing Li, Henan (CN); Zhangsheng Wang, Henan (CN)

(73) Assignee: Luoyang Landglass Technology Co., Ltd, Henan (CN)

( * ) Notice: Subject to any disclaimer, the term of this patent is extended or adjusted under 35 U.S.C. 154(b) by 239 days.

This patent is subject to a terminal disclaimer.

(21) Appl. No.: 13/511,089

(22) PCT Filed: Oct. 29, 2010

(86) PCT No.: PCT/CN2010/078237
§ 371 (c)(1),
(2), (4) Date: Aug. 1, 2012

(87) PCT Pub. No.: WO2011/063697
PCT Pub. Date: Jun. 3, 2011

(65) Prior Publication Data
US 2013/0004685 A1    Jan. 3, 2013

(30) Foreign Application Priority Data
Nov. 27, 2009  (CN) .......................... 2009 1 0250137

(51) Int. Cl.
| | |
|---|---|
| B23K 31/02 | (2006.01) |
| C03C 27/08 | (2006.01) |
| B23K 1/00 | (2006.01) |
| E06B 3/663 | (2006.01) |
| E06B 3/673 | (2006.01) |

(52) U.S. Cl.
CPC .............. *C03C 27/08* (2013.01); *B23K 1/0008* (2013.01); *E06B 3/66304* (2013.01); *E06B 3/66357* (2013.01); *E06B 3/67334* (2013.01)
USPC .......................... 228/121; 228/110.1; 228/175

(58) Field of Classification Search
None
See application file for complete search history.

(56) References Cited

U.S. PATENT DOCUMENTS

| | | | | |
|---|---|---|---|---|
| 2,336,544 | A  * | 12/1943 | Hopfield ........................ | 228/188 |
| 7,204,102 | B1 * | 4/2007 | Eames et al. ...................... | 65/36 |
| 8,512,829 | B2 * | 8/2013 | Cooper ........................... | 428/34 |
| 2001/0026852 | A1 * | 10/2001 | Poix et al. ....................... | 428/34 |

(Continued)

FOREIGN PATENT DOCUMENTS

| | | | |
|---|---|---|---|
| CN | 101302081 A | | 11/2008 |
| GB | 2207669 A | * | 2/1989 |

(Continued)

*Primary Examiner* — Kiley Stoner
(74) *Attorney, Agent, or Firm* — AKC Patents, LLC; Aliki K. Collins

(57) ABSTRACT

A method for sealing the curved vacuum glass comprises: first preparing metallized layer bonded with the glass plate on the edge surface of the curved glass to be sealed by locally heating the metal slurry coating; then air-tightly sealing the edges of two glass plates by using the metal brazing technology, or air-tightly sealing the edges of two glass plates by air-tightly welding the metal sealing sheet between the metallized layers of two glass plates to be sealed. A curved vacuum glass is also provided. The method makes the sealing part have firm connection, good air tightness and good thermal shock resistance. The sealing structure made of the metal sealing sheet is well compatible with the temperature deformation caused by the temperature difference between the internal and external glass plates of the vacuum glass.

8 Claims, 4 Drawing Sheets

(56) References Cited

U.S. PATENT DOCUMENTS

| | | |
|---|---|---|
| 2002/0035852 A1* | 3/2002 | Wang et al. .................. 65/34 |
| 2002/0046797 A1* | 4/2002 | Collins ...................... 156/107 |
| 2008/0166570 A1 | 7/2008 | Cooper |
| 2008/0245011 A1* | 10/2008 | Friedl ........................ 52/407.5 |
| 2010/0276473 A1* | 11/2010 | Hagen et al. ............... 228/121 |

FOREIGN PATENT DOCUMENTS

| | | |
|---|---|---|
| JP | 60-230335 A | * 11/1985 |
| JP | 11-077370 A | * 3/1999 |
| JP | 2000-063156 A | * 2/2000 |
| WO | WO 2009/000256 A1 | * 12/2008 |

* cited by examiner

METHOD FOR SEALING CURVED VACUUM GLASS AND CURVED VACUUM GLASS

TECHNICAL FIELD

The present invention relates to a method for sealing a curved vacuum glass and a curved vacuum glass product processed by using the method.

BACKGROUND ART

A vacuum glass formed by compounding a plurality of glass plates gains attention owing to excellent sound proof and heat insulating performances thereof, and also becomes a research subject.

In the past, the edges of glass plates were sealed by using various plastics or resin materials to prepare the vacuum glass. For example, organic glass such as PC, ABS, LDPE, PVC and the like referred in certain patents is used as a sealing material, sandwich glass materials of PVB, EVA (EN) and the like are adopted in certain patents, and the processing method for the materials comprises the steps of putting the material between two glass plates, preparing the material into a prefabricated element together with the glass plates and pressing the prefabricated element under proper conditions to realize sealing of the edges of the glass plates. Such process is similar to a process for making sandwich glass; though compound sealing between the glass plates can be realized, the gas permeability and the moisture permeability of most plastics and resin materials are much greater than those of the glass; moreover, most organic materials are only bonded with the surfaces of the glass plates physically, so it is difficult to ensure no leakage at the bonded sections; and once gas (comprising water vapor) is permeated, weakening of the sealing strength, dew formation in the sandwich layer and glass mildew are directly occurred. In addition, as time goes on, the aging problem of the organic materials also directly affects the service life of the vacuum glass. Therefore, the method has gradually faded out the fabrication of the vacuum glass.

Later, a frit with a low melting point is used as a sealing material for making the vacuum glass, namely the frit with the low melting point is placed at the positions to be sealed on the edges of two adjacent glass plates, and the frit with the low melting point is melted by means of flame or electrical heating so as to air-tightly connect the edges of the two glass plates. The frit with the low melting point adopted in the process is generally a lead-zinc series (PbO—ZnO) glass material, and such a material has environmental protection risk in long-term use since lead metal is harmful to the environment and human health; meanwhile, the glass plates sealed by using the process will generate boundary heat stress, thereby needing an additional proper annealing treatment which greatly lowers the production efficiency and improves the processing cost; particularly, the heating temperature during sealing in the process is generally about 400-500° C., so if the process is used for making curved vacuum glass, the curved glass must be placed in a mold, otherwise, the original shape of the curved glass is destroyed and the curved glass cannot be normally sealed owing to deformation; and when the mold is used for sealing, the process and the equipment are complex, and the production efficiency is low because only a single piece of curved glass is produced in the same time. As an important type of glass product, the curved glass is greatly required in reality, so how to process the curved vacuum glass becomes a subject to be solved.

INVENTION CONTENTS

Aiming at the problems in the prior art, the purpose of the present invention is to provide a method for sealing a curved vacuum glass and the curved vacuum glass processed by using the method.

For this purpose, the method for sealing the curved vacuum glass comprises the following steps:

1) Preparing metal paste coatings on the surfaces to be sealed on the edges of curved glass plates;

2) Locally heating the positions of the metal paste coatings to sinter the metal paste coatings into metallized layers bonded with the curved glass plates; and 3) Directly air-tightly welding the mutually corresponding metallized layers on the two glass plates to be sealed by adopting a metal brazing process to realize air-tight sealing of the edges of the two glass plates; or air-tightly welding a metal sealing sheet between the metallized layers of the two glass plates to be sealed to realize air-tight sealing of the edges of the two glass plates.

Further, the metal paste coatings are prepared on the surfaces of the glass plates in a manner of dip coating, spray coating, screen printing, manual coating or mechanical coating.

Further, the local heating manner in the step 2) is laser heating, flame heating, electric current heating, induction heating or microwave heating.

When the metallized layers on the two glass plates are welded by adopting the metal brazing process, a solder metal foil is placed between the corresponding metallized layers on the two glass plates, or a solder metal is pre-plated on the surface of at least one of metallized layers, and subsequent welding is completed by the metal brazing process.

Further, the solder metal foil and the solder metal are made of tin alloy solder.

Further, the metal brazing process is performed under the protection of an inert gas, or in an environment of $H_2$ gas or $N_2$ gas, or in a vacuum environment.

Further, the brazing temperature of the metal brazing process is less than or equal to 350° C.

When the edges of the two glass plates are air-tightly sealed by using the metal sealing sheet, the metal sealing sheet can consist of a metal sheet, and can also consist of two metal sheets.

Further, the metal sealing sheet consists of two metal sheets; when the edges of the two glass plates are air-tightly sealed, the two metal sheets are alternatively air-tightly welded with the metallized layers on the two glass plates to be sealed by a metal brazing process or an ultrasonic welding process, and the two metal sheets are air-tightly welded to realize air-tight sealing of the edges of the two glass plates.

Further, after the two metal sheets are respectively led out of the glass plates connected therewith, the two metal sheets are mutually air-tightly welded by the metal brazing process or the ultrasonic welding process or a melt welding process.

Further, the two metal sheets are led out of the space between the two glass plates to be sealed, and the two metal sheets are respectively air-tightly welded with the metallized layers on the inner surfaces of the two glass plates to be sealed.

Further, one of the two metal sheets is led out of the space between the two glass plates to be sealed, the led-out metal sheet is air-tightly welded with the metallized layer on the inner surface of one glass plate, and the other metal sheet is air-tightly welded with the metallized layer on the outer surface of the other glass plate.

Further, the two metal sheets are respectively air-tightly welded with the metallized layers on the outer surfaces of the two glass plates to be sealed.

Further, the metallized layers are prepared on the edges of the glass plates to be sealed; and the metal sealing sheet consists of a metal sheet, and the metal sheet is respectively air-tightly welded with the metallized layers on the two glass plates to be sealed by the metal brazing process or the ultrasonic welding process.

Further, the metal sealing sheet consists of a metal sheet with U-shaped section, and two side edges of the U-shaped metal sheet are respectively air-tightly welded with the metallized layers on the two glass plates to be sealed.

Further, the U-shaped metal sheet is positioned between the two glass plates to be sealed, and the sides of the U-shaped metal sheet are air-tightly welded with the metallized layers by the metal brazing process.

Further, the two side edges of the U-shaped metal sheet are positioned between the two glass plates to be sealed and air-tightly welded with the metallized layers by the metal brazing process, and the bottom of the U-shaped section of the metal sheet partially extends out of the two glass plates.

Further, one side edge of the U-shaped metal sheet is positioned between the two glass plates to be sealed and air-tightly welded with the metallized layer on the inner surface of one glass plate by the metal brazing process or the ultrasonic welding process, and the other side edge of the metal sheet bypasses the edge of the other glass plate and then is air-tightly welded with the metallized layer on the outer surface of the glass plate by the metal brazing process or the ultrasonic welding process.

Further, the U-shaped metal sheet wraps the edges of the two glass plates to be sealed, and two side edges of the U-shaped metal sheet are respectively air-tightly welded with the metallized layers on the outer surfaces of the two glass plates by the metal brazing process or the ultrasonic welding process.

A curved vacuum glass comprises at least two or more curved glass plates compounded mutually, wherein the rims of the vacuum glass are sealed by the sealing method.

The metallized layers are sintered on the surfaces of the curved glass plates. The edges of the two glass plates are air-tightly sealed by adopting the welding process based on the metallized layers, and particularly, the metallized layers are prepared by adopting a local heating manner, so that the heating range of the curved glass plates is controlled at the edge parts thereof; no matter previous local heating for sintering the metallized layers or subsequent welding process, the glass plates are heated in short time, so that the curved glass plates are prevented from deforming owing to over heating, and a condition is created for making the curved vacuum glass. The curved vacuum glass manufactured by using the method of the present invention has the advantages of firm connection, high air tightness, good thermal shock resistance and the like of the sealed parts; and a sealing structure consisting of the metal sealing sheet can well adapt to the temperature deformation generated owing to temperature difference of the internal and external glass plates in the vacuum glass, and technical guarantee is provided for safe use of the curved vacuum glass.

DETAILED DESCRIPTION

The present invention is further explained in conjunction with the drawings as follows.

Figure 1:
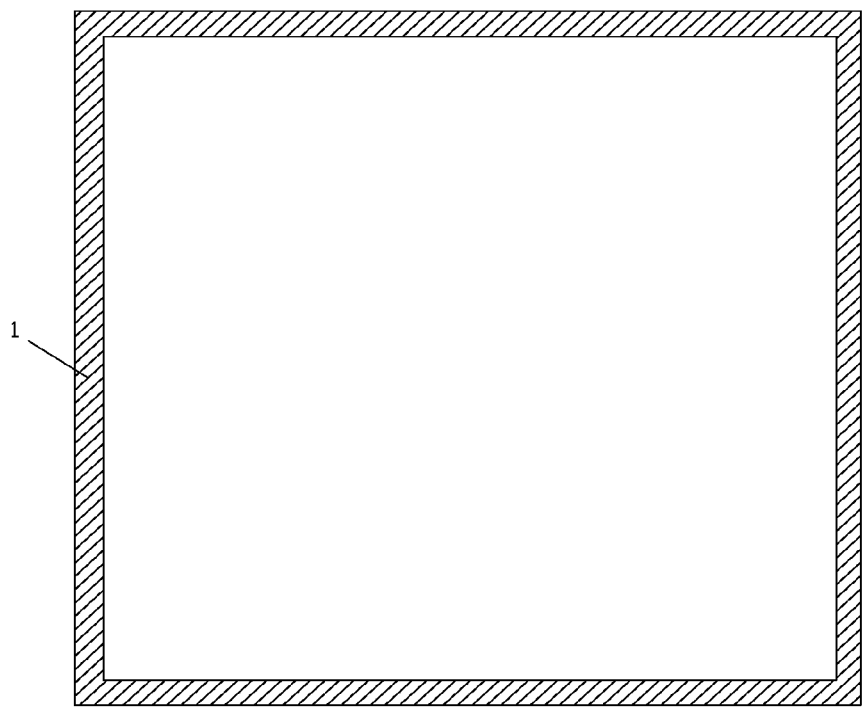
FIG. 1 is a schematic diagram of glass plates, the surfaces of which are sintered with metallized layers.
Figure 2:
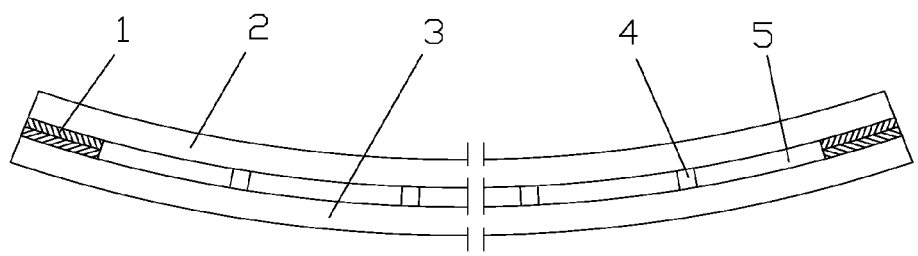
FIG. 2 is a structural schematic diagram of the embodiment 1 of a vacuum glass of the present invention.

According to the sealing method of the present invention, when the curved vacuum glass is made by using curved glass plates, the sealing method comprises the following steps: preparing metal paste coatings on the surfaces to be sealed on the edges of the curved glass plates; locally heating the positions of the metal paste coatings to sinter the metal paste coating into the metallized layers bonded with the glass plates, wherein the sintered metallized layers 1 are shown as FIG. 1; compounding the two glass plates 2 and 3 to be sealed according to the state shown as FIG. 2, and arranging a metal brazing solder between the two mutually corresponding metallized layers 1 on the two glass plates 2 and 3; and finally, mutually air-tightly welding the two mutually corresponding metallized layers 1 on the two glass plates by adopting a metal brazing process to realize air-tight sealing of the edges of the two curved glass plates. Reference number 4 in the FIG. 2 refers to middle support spacer arranged between the two glass plates 2 and 3, and reference number 5 refers to vacuum space formed between the two sealed glass plates 2 and 3.

Wherein, the metal paste coatings are prepared on the surfaces of the glass plates in a manner of dip coating, spray coating, screen printing, manual coating or mechanical coating.

When the metal paste coatings are sintered, the positions of the metal paste coatings on the glass plates are locally heated in a manner of laser heating, flame heating, electric current heating, induction heating or microwave heating.

When a metal brazing solder is arranged between the corresponding metallized layers 1 on the two glass plates, a manner of placing a solder metal foil can be adopted, or a solder metal is pre-plated on the surface of at least one metallized layer 1, and subsequent welding is completed according to the metal brazing process.

The selected solder metal foil and the pre-plated solder metal can be made of tin alloy solder, so that the brazing temperature can be reduced as much as possible to avoid affecting the curved state of the curved glass plates.

The brazing process can be performed under the protection of an inert gas or in an environment of $H_2$ gas or $N_2$ gas, and can also be performed in a vacuum environment, thus improving the brazing quality.

Because the metallized layers 1 on the two glass plates are mutually welded and connected by the metal brazing process, naturally, the metal material for forming the metallized layers should be the one suitable for brazing.

For avoiding affecting the curved state of the curved glass plates in the welding process, the brazing temperature of the metal brazing process should be controlled to be less than or equal to 350° C.

Various proper heating manners such as induction heating, laser heating, microwave heating and the like can be adopted in the metal brazing process.

Figure 3:
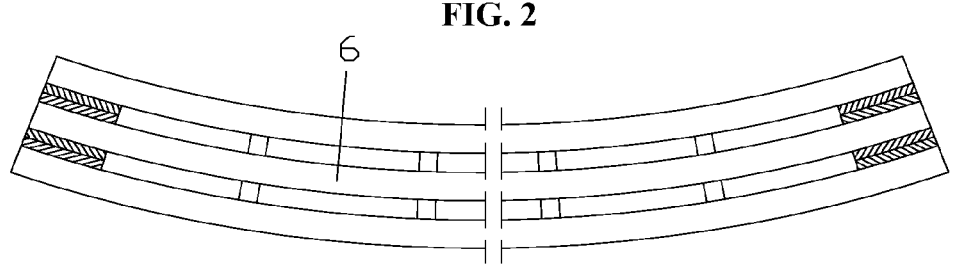
FIG. 3 is a structural schematic diagram of the embodiment 2 of the present invention.

The FIG. 2 shows the curved vacuum glass formed by compounding two glass plates. According to the sealing method of the present invention, the curved vacuum glass formed by compounding three or more curved glass plates shown as FIG. 3 can be processed. Different from the vacuum glass in the FIG. 2, in the vacuum glass shown as the FIG. 3, the metallized layers 1 need to be sintered on the upper and lower side surfaces of the curved glass plate 6 positioned in the middle, so that the curved glass plate 6 is respectively welded and connected with the metallized layers 1 on the upper and lower glass plates.

In the sealing method of the present invention, after sintering of the metallized layers 1 on the surfaces of the glass plates is completed, the edges of the two glass plates are sealed by adopting the metal brazing process and directly welding the metallized layers 1 on the two glass plates, air-tight sealing of the edges of the two glass plates can also be realized by air-tightly welding a metal sealing sheet between the metallized layers 1 of the two glass plates to be sealed, and the metal sealing sheet can consist of one metal sheet or two metal sheets.

When the metal sealing sheet consists of one metal sheet, the metal sheet can be the one with U-shaped section. The embodiment 3 in the FIG. 4 is taken as an example as follows to explain the sealing method for sealing the edges of the two glass plates by using the metal sheet with the U-shaped section.

Figure 4:
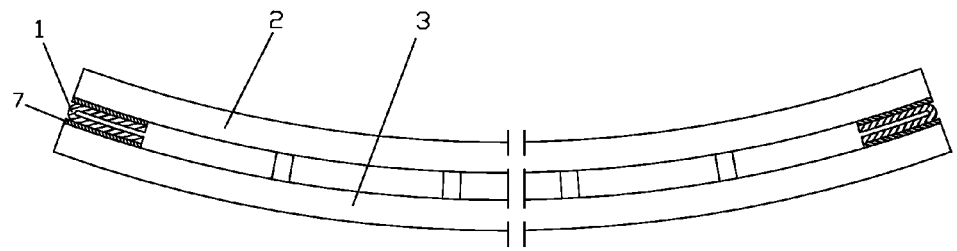
FIG. 4 is a structural schematic diagram of the embodiment 3 of the present invention.
Figure 5:
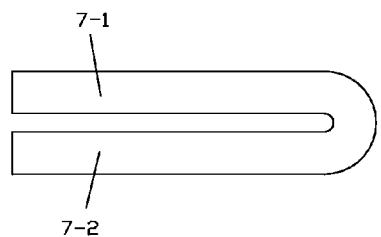
FIG. 5 is a structural schematic diagram of a metal sealing sheet 7 in FIG. 4.

Firstly, as above mentioned, it comprises the following steps: sintering the metallized layers 1 shown as the FIG. 1 on the surfaces to be sealed on the edges of the curved glass plates in a local heating manner; compounding the upper and lower glass plates 2 and 3 according to the state shown as the FIG. 4, and arranging the metal sheet 7 with the U-shaped section as FIG. 5 between the metallized layers 1 of the two glass plates, so that the two side edges 7-1 and 7-2 of the metal sheet 7 are respectively opposite to the metallized layers 1 on the upper and lower glass plates; arranging a metal brazing solder between the side edges 7-1 and 7-2 of the metal sheet 7 and the metallized layers 1; and finally, air-tightly welding the two side edges 7-1 and 7-2 of the metal sheet 7 and the respectively corresponding metallized layers 1 by adopting a metal brazing process to complete air-tight sealing of the edges of the two glass plates 2 and 3.

Because the metal sheet 7 is connected with the metallized layers 1 by brazing, the metal sheet 7 with U-shaped section should also be made of metal suitable for brazing.

Figure 6:
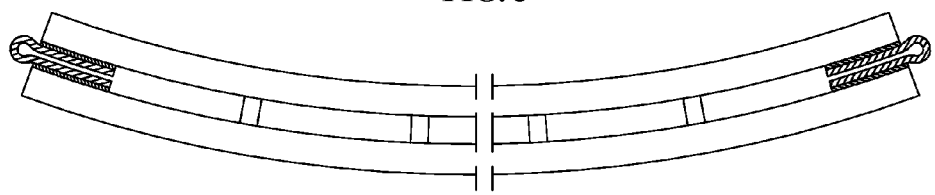
FIG. 6 is a structural schematic diagram of the embodiment 4 of the present invention.

FIG. 6 shows the embodiment 4 of the present invention. In the embodiment, two side edges 7-1 and 7-2 of the metal sheet 7 with the U-shaped section are positioned between the upper and lower glass plates to be sealed, and the bottom of the U-shaped section of the metal sheet 7 partially extends out of the two glass plates. Compared with the embodiment 3 in the FIG. 4, the metal sheet 7 in the embodiment has higher deformation margin and can adapt to relatively higher temperature deformation between the two glass plates. The metal sheet 7 in the embodiment is air-tightly welded and connected with the metallized layers 1 by the metal brazing process.

Figure 7:
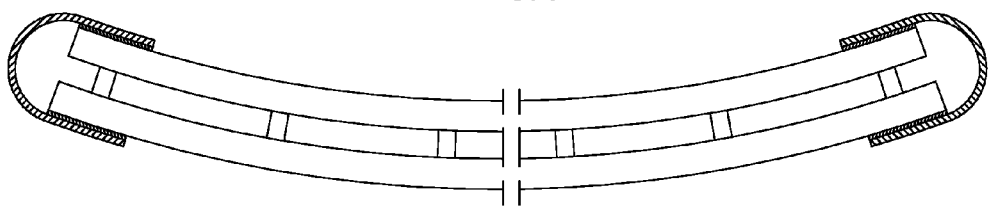
FIG. 7 is a structural schematic diagram of the embodiment 5 of the present invention.

In the embodiment 5 shown as FIG. 7, the metal sheet 7 with the U-shaped section wraps the edges of the upper and lower glass plates 2 and 3 to be sealed, and the two side edges 7-1 and 7-2 of the metal sheet 7 are respectively air-tightly welded with the metallized layers 1 on the outer surfaces of the two glass plates 2 and 3.

Figure 8:
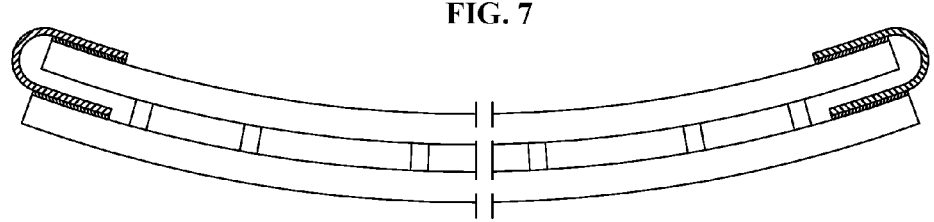
FIG. 8 is a structural schematic diagram of the embodiment 6 of the present invention.

In the embodiment 6 shown as FIG. 8, one side of the metal sheet 7 with the U-shaped section is positioned between the two glass plates to be sealed and air-tightly welded with the metallized layer 1 on the inner surface of the lower glass plate, and the other side of the metal sheet 7 goes around the edge of the upper glass plate and then is air-tightly welded with the metallized layer 1 on the outer surface of the upper glass plate.

It should be pointed that when the curved vacuum glass shown as the FIG. 7 and the FIG. 8 is made, the two side edges of the metal sheet 7 are air-tightly welded with the metallized layers 1 by the metal brazing process or the ultrasonic welding process.

The vacuum glass in the embodiments shown as the FIG. 4 to the FIG. 8 is formed by compounding two glass plates, the metal sheet 7 with the U-shaped section is used as a metal sealing sheet, and a vacuum glass comprising three or more glass plates can also be made.

Figure 9:
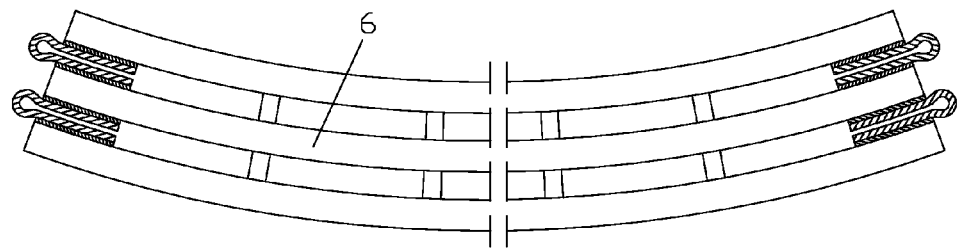
FIG. 9 is a structural schematic diagram of the embodiment 7 of the present invention.

In the embodiment 7 shown as FIG. 9, the vacuum glass is formed by compounding three curved glass plates. Different from the vacuum glass compounded by using two glass plates, the metallized layers 1 are sintered on two side surfaces of a glass plate 6 positioned in the middle, so that the glass plate 6 is respectively air-tightly sealed with the two glass plates positioned above and below the glass plate 6 through the metal sheet 7 with the U-shaped section.

Figure 10:
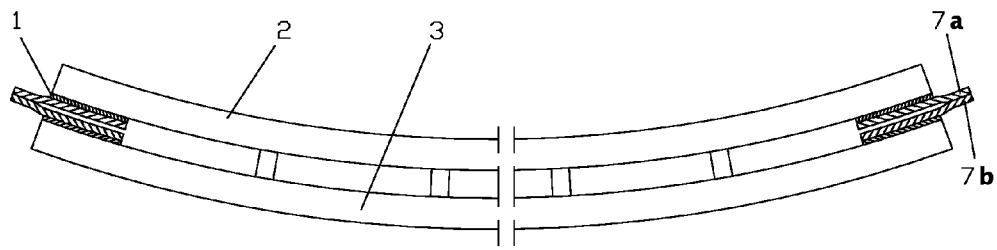
FIG. 10 is a structural schematic diagram of the embodiment 8 of the present invention.

FIG. 10 shows the embodiment 8 of the present invention, and when the metal sealing sheet in the embodiment consists of two metal sheets, the sealing steps are as follows.

Firstly, as mentioned above, it comprises the following steps: sintering the metallized layers 1 bonded with the glass plates as the FIG. 1 on the surfaces to be sealed on the edges of the curved glass plates in a local heating manner; respectively air-tightly welding the upper and lower metal sheets 7a and 7b and the metallized layers 1 on the upper and lower glass plates 2 and 3, and leading the metal sheets out of the glass plates connected therewith; and finally, compounding the two glass plates 2 and 3 according to the state shown as the FIG. 10, and mutually air-tightly welding the parts extending out of the two glass plates on the two metal sheets 7a and 7b to realize air-tight sealing of the edges of the two glass plates 2 and 3.

The metal sheets 7a and 7b are air-tightly welded with the metallized layers 1 on the glass plates 2 and 3 by a metal brazing process or an ultrasonic welding process.

The parts extending out of the glass plates on the two metal sheets 7a and 7b are air-tightly welded by adopting the metal brazing process or the ultrasonic welding process or the melt welding process.

Figure 11:
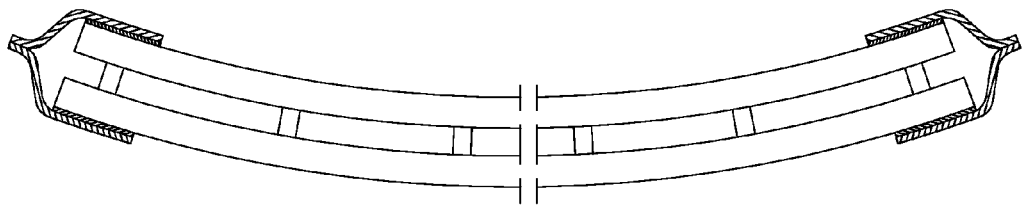
FIG. 11 is a structural schematic diagram of the embodiment 9 of the present invention.

FIG. 11 shows the embodiment 9 of the present invention. Compared with the embodiment 8, the metal sheet 7b in the embodiment 9 is led out of the space between the two glass plates and air-tightly welded with the metallized layer 1 on the inner surface of the lower glass plate, and the metal sheet 7a is air-tightly welded with the metallized layer 1 on the outer surface of the upper glass plate.

Figure 12:
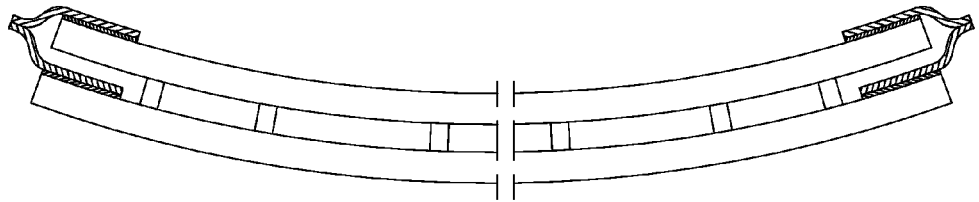
FIG. 12 is a structural schematic diagram of the embodiment 10 of the present invention.

FIG. 12 shows the embodiment 10 of the present invention. In the embodiment, the two metal sheets 7a and 7b are respectively air-tightly welded with the metallized layers 1 on the outer surfaces of the two glass plates.

Figure 13:
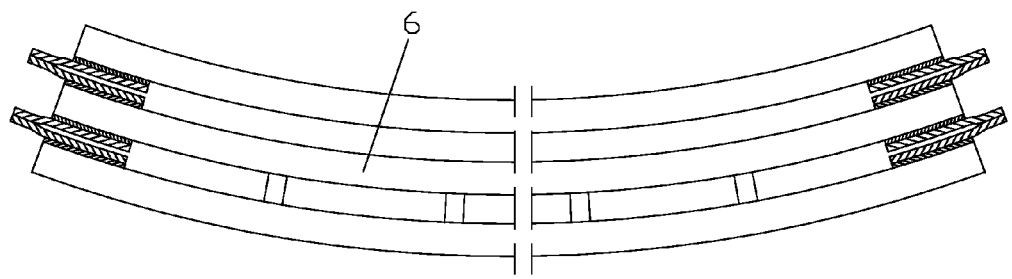
FIG. 13 is a structural schematic diagram of the embodiment 11 of the present invention.

FIG. 13 shows the embodiment 11 of the present invention. The vacuum glass in the embodiment is formed by compounding three curved glass plates. As mentioned above, the metallized layers 1 are sintered on the upper and lower surfaces of the curved glass plate 6 positioned in the middle, so that the glass plate 6 is respectively air-tightly sealed with the two glass plates positioned above and below the glass plate 6 through the metal sheets 7a and 7b.

Figure 14:
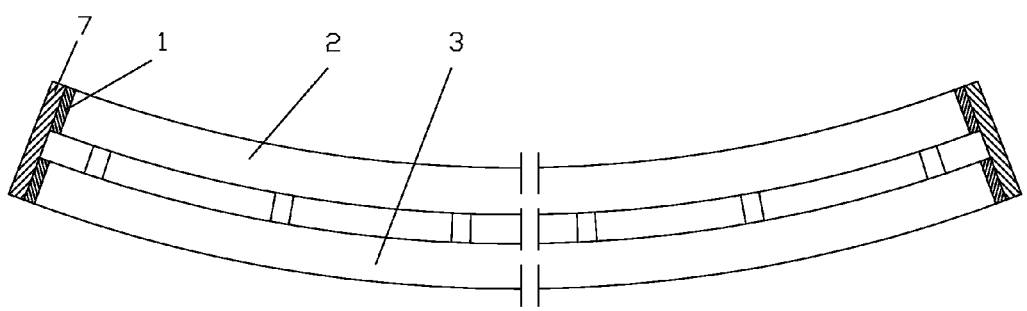
FIG. 14 is a structural schematic diagram of the embodiment 12 of the present invention.

FIG. 14 shows the embodiment 12 of the present invention. As a special embodiment of the present invention, in the embodiment 12, the metallized layers 1 are sintered on the edges of the glass plates 2 and 3. The edges of the two glass plates 2 and 3 are sealed through a metal sheet 7, and the metal sheet 7 is respectively air-tightly welded with the metallized layers 1 on the edges of the two glass plates.

Figure 15:
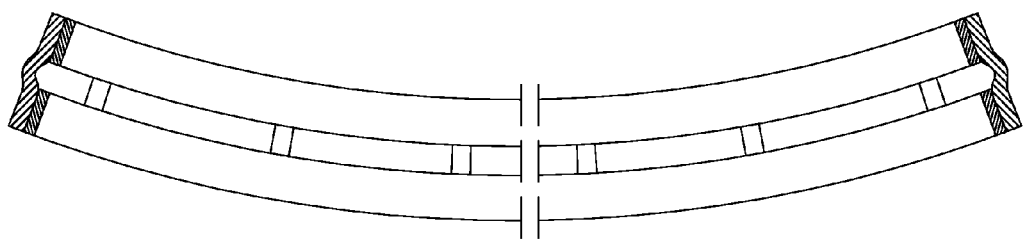
FIG. 15 is a structural schematic diagram of the embodiment 13 of the present invention In the diagrams, reference number 1 refers to metallized layers sintered on curved glass plates; reference number 2 refers to upper curved glass plate; reference number 3 refers to lower curved glass plate; reference number 4 refers to middle support spacer; reference number 5 refers to vacuum space between the two curved glass plates; reference number 6 refers to middle curved glass plate; reference number 7 refers to metal sheet; reference number 7-1 refers to upper side edge of the metal sheet 7 with U-shaped section; reference number 7-2 refers to lower side edge of the metal sheet 7 with U-shaped section; reference number 7a refers to upper metal sheet and reference number 7b refers to lower metal sheet.

In order that the metal sealing sheet 7 can adapt to relatively high telescopic deformation owing to the temperature difference between the edges of the internal and external glass plates, shown as the embodiment 13 in FIG. 15, an arc connecting section can be arranged on the middle part of the metal sealing sheet 7 in the embodiment 12.

The embodiments shown as the FIG. 14 and the FIG. 15 are simple in structure, convenient to operate and particularly suitable to be adopted when the glass plates are thick.

The above examples are just used for describing the present invention. Embodiments of the present invention shall not be limited to the examples described here, and various specific manners of execution carried out by the skilled person in the art under the condition of perceiving the invention all should be within the extent of protection in the invention.

The invention claimed is:

1. A method for sealing curved vacuum glass, comprising the following steps:
   1) preparing metal paste coatings on surfaces to be sealed on edges of two curved glass plates;
   2) locally heating the positions of the metal paste coatings to sinter the metal paste coatings into two metallized layers bonded with the edges of the two curved glass plates, respectively; and
   3) directly air-tightly joining the mutually corresponding two metallized layers on the two curved glass plates to be sealed by brazing two metal sheets with the two metallized layers on the edges of the two curved glass plates, respectively;
   wherein one of the two metal sheets is positioned between the two curved glass plates and is brazed onto one of the two metallized layers sintered on an inner surface of one of the two curved glass plates and the other of the two metal sheets is positioned onto an outer surface of the other of the two curved glass plates and is brazed onto the other of the two metallized layers sintered on the outer surface of the other of the two curved glass plates; and
   wherein edges of the two metal sheets protruding from the edges of the two curved glass plates are joined to the by a metal brazing process or an ultrasonic welding process.

2. The method according to claim 1, wherein the metal paste coatings are prepared on the surfaces of the two glass plates via dip coating, spray coating, screen printing, manual coating or mechanical coating.

3. The method according to claim 1, wherein the local heating manner in the step 2) is laser heating, flame heating, current heating, induction heating or microwave heating.

4. The method according to claim 1, wherein the two metal sheets comprise a solder metal and when the step 3) is performed, a solder metal foil is placed on the corresponding metallized layers on the two curved glass plates, or the solder metal is pre-plated on the surface of at least one of the metallized layers, and subsequent welding-joining is completed by the metal brazing process or the ultrasonic welding process.

5. The method according to claim 4, wherein the solder metal foil and the solder metal are made of tin alloy solder.

6. The method according to claim 1, wherein the metal brazing process is performed under the protection of an inert gas, or in an environment of $H_2$ gas or $N_2$ gas, or in a vacuum environment.

7. The method according to claim 1, wherein the brazing temperature of the metal brazing process is less than or equal to 350° C.

8. A method for sealing curved vacuum glass, wherein the method comprises the following steps:
   1) preparing metal paste coatings on surfaces to be sealed on edges of two curved glass plates;
   2) locally heating the positions of the metal paste coatings to sinter the metal paste coatings into two metallized layers bonded with the two curved glass plates, respectively; and
   3) joining a metal sealing sheet between the metallized layers of the two curved glass plates to be sealed to realize air-tight sealing of the edges of the two curved glass plates;
   wherein the metal sealing sheet comprises a U-shaped metal sheet, and two sides of the U-shaped metal sheet are respectively air-tightly joined with the two metallized layers on the two curved glass plates to be sealed to realize air-tight sealing of the edges of the two curved glass plates;
   wherein one side of the U-shaped metal sheet is positioned between the two curved glass plates to be scaled and air-tightly joined with the metallized layer on an inner surface of one curved glass plate by a metal brazing process or an ultrasonic welding process, and the other side of the U-shaped metal sheet goes around an edge of the other curved glass plate and then is air-tightly joined with the metallized layer on an outer surface of the other curved glass plate by the metal brazing process or the ultrasonic welding process.

* * * * *